United States Patent
Chen (10) Patent No.: US 8,789,097 B2
(45) Date of Patent: Jul. 22, 2014

(54) METHOD AND SYSTEM FOR PROVIDING CHANNEL INFORMATION, AND COMPUTER READABLE STORAGE MEDIUM

(71) Applicant: Wistron Corp., New Taipei (TW)

(72) Inventor: Li-Hsuan Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/751,072

(22) Filed: Jan. 26, 2013

(65) Prior Publication Data

US 2014/0013356 A1    Jan. 9, 2014

(30) Foreign Application Priority Data

Jul. 9, 2012   (TW) .............................. 101124624 A (51) Int. Cl.
*H04N 5/445*   (2011.01)
*H04N 21/482*   (2011.01)

(52) U.S. Cl.
CPC ................................... *H04N 21/482* (2013.01)
USPC ................................... 725/38; 725/56; 725/61

(58) Field of Classification Search
CPC .......... H04N 21/4403; H04N 21/4126; H04N 21/42227; H04N 21/440263; G08C 2201/33; G08C 2201/92
USPC ............................ 725/57, 61, 38–41; 348/734
See application file for complete search history.

(56) References Cited

U.S. PATENT DOCUMENTS

| | | | |
|---|---|---|---|
| 5,886,690 A * | 3/1999 | Pond et al. ..................... | 715/720 |
| 6,754,905 B2 * | 6/2004 | Gordon et al. .................. | 725/38 |
| 8,151,301 B2 * | 4/2012 | Bennett ........................... | 725/41 |
| 2008/0066135 A1 * | 3/2008 | Brodersen et al. ............ | 725/134 |
| 2009/0037817 A1 * | 2/2009 | Bennetts et al. .............. | 715/716 |
| 2010/0050200 A1 | 2/2010 | Tsai et al. | |
| 2010/0231792 A1 * | 9/2010 | Sharma et al. ................ | 348/565 |
| 2013/0024895 A1 * | 1/2013 | Yong et al. ..................... | 725/41 |

* cited by examiner

*Primary Examiner* — Pankaj Kumar
*Assistant Examiner* — Timothy Newlin
(74) *Attorney, Agent, or Firm* — Li & Cai Intellectual Property (USA) Office (57) ABSTRACT

A method for providing channel information is illustrated. The method includes: receiving a command for switching channels when a first channel content is displayed on a display unit; determining whether the command indicates a continuous switching mode or a discrete switching mode; displaying the first channel content and descriptive information of a plurality of channels being switched until a second channel among the channels being switched is selected at the continuous switching mode; displaying preview information of the second channel to replace the first channel content and loading the second channel content when the second channel is selected at the continuous switching mode or when the second channel is switched according to the command at the discrete switching mode; displaying the second channel content when loading completed. The data quantity of the preview information is larger than that of the description information.

16 Claims, 9 Drawing Sheets

METHOD AND SYSTEM FOR PROVIDING CHANNEL INFORMATION, AND COMPUTER READABLE STORAGE MEDIUM

BACKGROUND

1. Field of the Invention

The instant disclosure relates to a method for providing information and a system thereof; in particular, to a method for providing channel information and a system thereof.

2. Description of Related Art

When surfing from one channel to another on a digital television, a buffering time occurs before the next channel displays on the screen. The buffering time results in a pause without any content on the screen which is a common issue found in the conventional digital television. A user may not be able to distinguish weather a command has been received due to the temporary pause therefore a following command cannot be given until the buffering time is over.

The discrete screen display also causes interruption in viewing and the user may find the interruption irritating.

As digital television technology advances, the output content includes not only program content but also information or service from the Internet. The Internet information or service and the television programs may be obtained from different platforms so the buffering time is likely to increase for longer processing which results in lengthy pause. The conventional channel information system may not be able to fully support the information obtained from the Internet and the lengthy pause results in extensive interruption.

SUMMARY OF THE INVENTION

The object of the instant disclosure is to provide a method for providing channel information adapted for a display device with a display unit. The method includes the following steps. Firstly, a command is received for switching channels when a first channel content is displayed on the display unit. Secondly, the command is determined whether to indicate a continuous switching mode or a discrete switching mode. In the case of continuous switching mode, the first channel content and descriptive information associated with a plurality of channels being switched are simultaneously displayed until a second channel is selected. Then, the preview information of the second channel replaces the first channel content in the continuous switching mode or when the second channel is selected under the discrete switching mode. Finally, the second channel content is fully displayed when the loading thereof is completed. The data quantity of the preview information is larger than that of the descriptive information.

In addition, the instant disclosure provides a computer readable storage medium to store a set of program code. When the program code is loaded to a processor, the processor executes the aforementioned method for providing channel information according to the set of program code.

Moreover, an exemplary embodiment of the instant disclosure provides a channel information system to display channel information on the display unit. The system includes a command receiving module and a process unit. The command receiving module receives the command for switching channels and the process unit interconnects the command receiving module and the display unit. The continuous or discrete channel switching mode, starting from the first channel, is determined according to the channel switching command. In the case of continuous switching mode, the first channel content and descriptive information associated with a plurality of channels being switched are simultaneously displayed until a second channel is selected. Then, the preview information of the second channel replaces the first channel content in the continuous switching mode or when the second channel is selected under the discrete mode. Finally, the second channel content is fully displayed when loading thereof is completed. The data quantity of the preview information is larger than that of the descriptive information.

In summary, the instant disclosure, which provides the method for providing channel information and the system thereof, displays information of different quantities or obtained from various sources according to the related channel switching mode. The buffering time is filled with the preview or descriptive information without exceeding the processing capacity of the process unit.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[Embodiment of a Method for Providing Channel Information]

Figure 1:
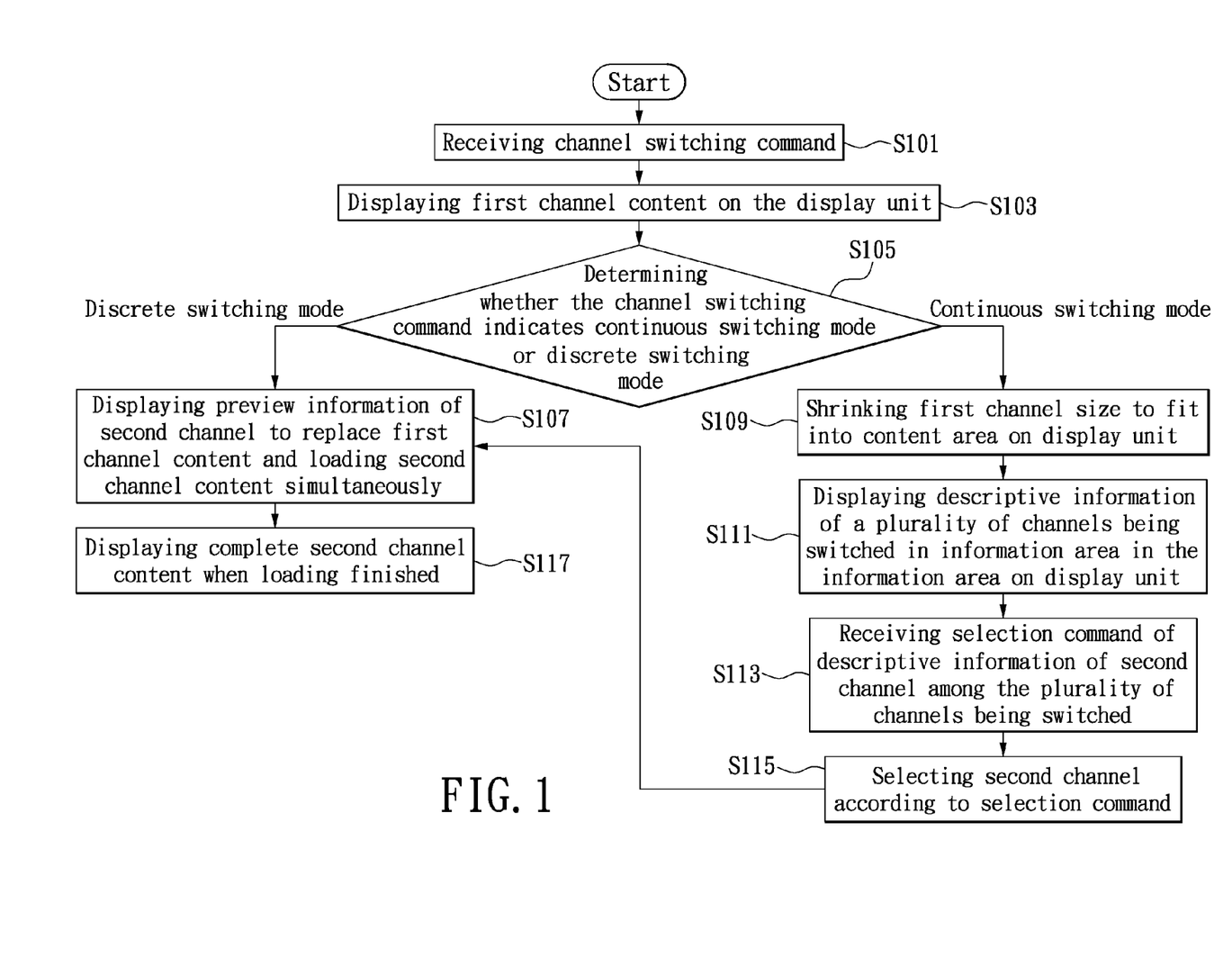
FIG. 1 illustrates a flow chart of a method for providing channel information in accordance with one embodiment of the instant disclosure.

Please refer to FIG. 1 illustrating a flow chart of a method for providing channel information in accordance with an embodiment of the instant disclosure. The flow chart discloses that under different switching modes, different information is provided without exceeding the process capacity. The method can be implemented on television systems which can provide a plurality of channels with various contents; for example, digital television (DTV), Internet protocol television (IPTV) and the like. For better understanding of different types of information display, please refer to the following description in conjunction with FIG. 2A~2E, which illustrate schematic diagrams of a display unit. The display device in FIG. 2A~2E can be television systems.

Figure 2A:
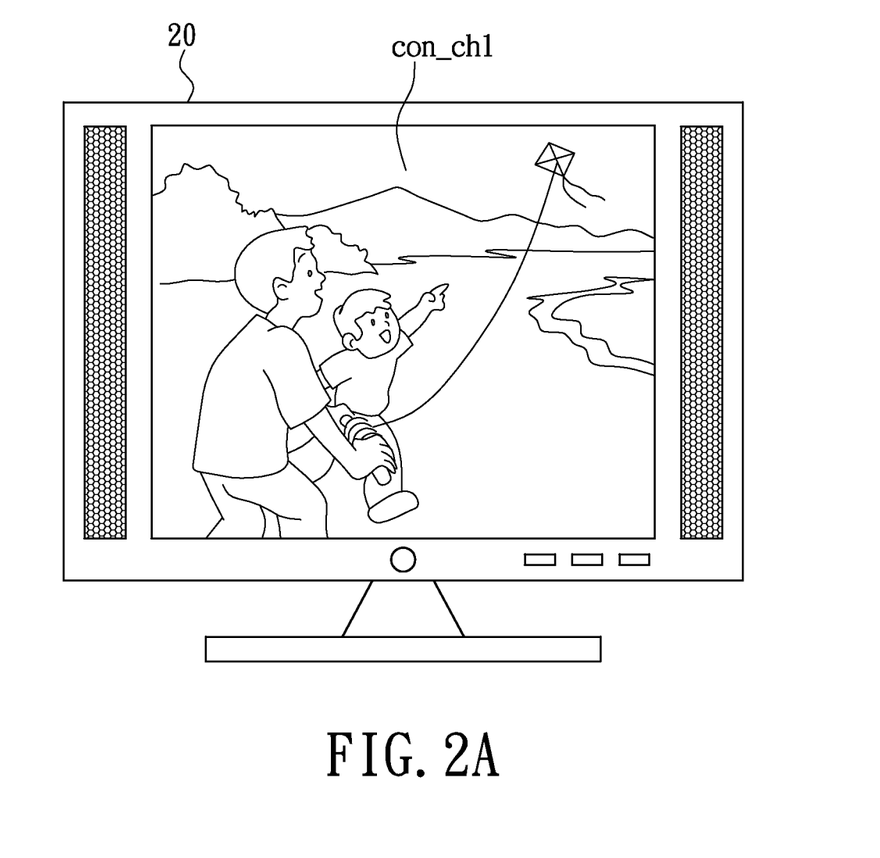
FIG. 2A~2E illustrate schematic diagrams of a display unit displaying channel information in accordance with one embodiment of the instant disclosure.

Please refer to FIG. 1 in conjunction with FIG. 2A. When the television system is powered on, a display unit 20 (for example, a screen) shows audio/visual content from at least one channel; for instance, drama, news or Internet obtained information and service. The instant embodiment displays a first channel content con_ch1 (S101) before switching channels. Referring back to FIG. 1, as the first channel content con_ch1 is displayed on the display unit 20, a user may give a channel switching command by a remote control at any time and the channel switching commend is received by a command receiving module in the television system then transmitted to a process unit (S103). The process unit registers signals or information from the channel switching command and further determines the corresponding switching mode. In other words, the process unit determines whether to proceed with continuous or discrete switching mode by the channel switching command (S105).

Figure 2B:
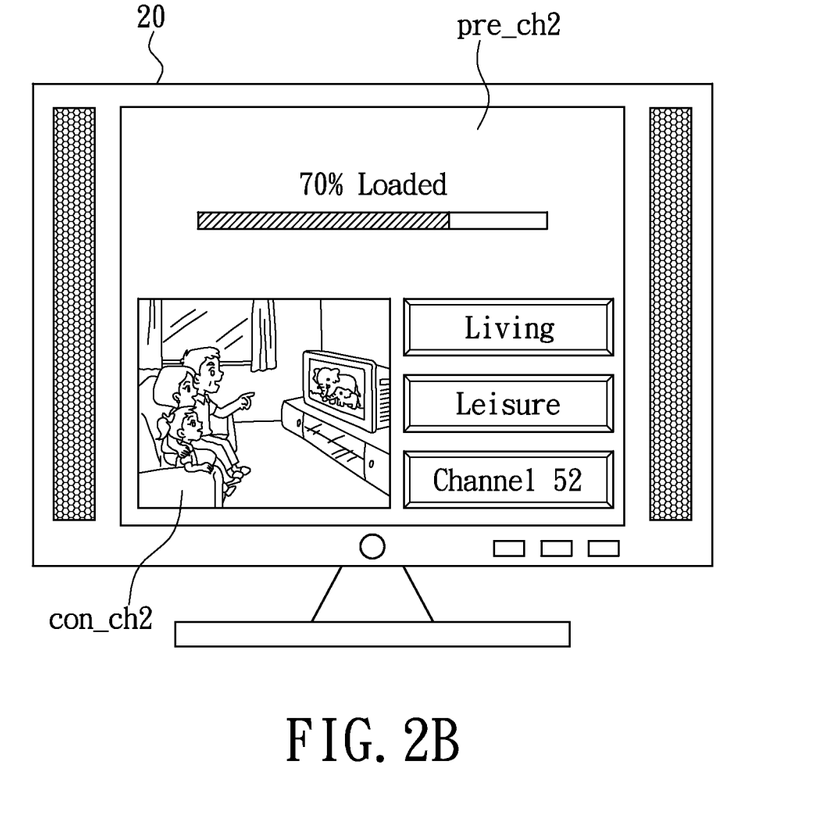

Please refer to FIG. 2B. In the case of discrete switching mode, before a new channel content is completely loaded (in the instant embodiment, a second channel represents the new channel), the process unit transmits a preview information of the second channel pre_ch2 to the display unit 20 to replace the current first channel content con_ch1 and simultaneously load the second channel content (S107). The preview information of the second channel pre_ch2 consists of associated audio, video streams, images, text and the combination thereof. Specifically, the second channel audio/visual content con_ch2 is displayed with lower resolution or smaller displaying size to reduce the data quantity yet provide immediate channel preview information to the user. Moreover, as shown in FIG. 2B, the preview information of the second channel pre_ch2 may include, for example, program name ("Living"), channel number ("52"), program type ("Leisure") and the associated information. In addition, a progression bar showing the progress of content loading can also be displayed (for example, "70% Loaded").

Figure 2C:
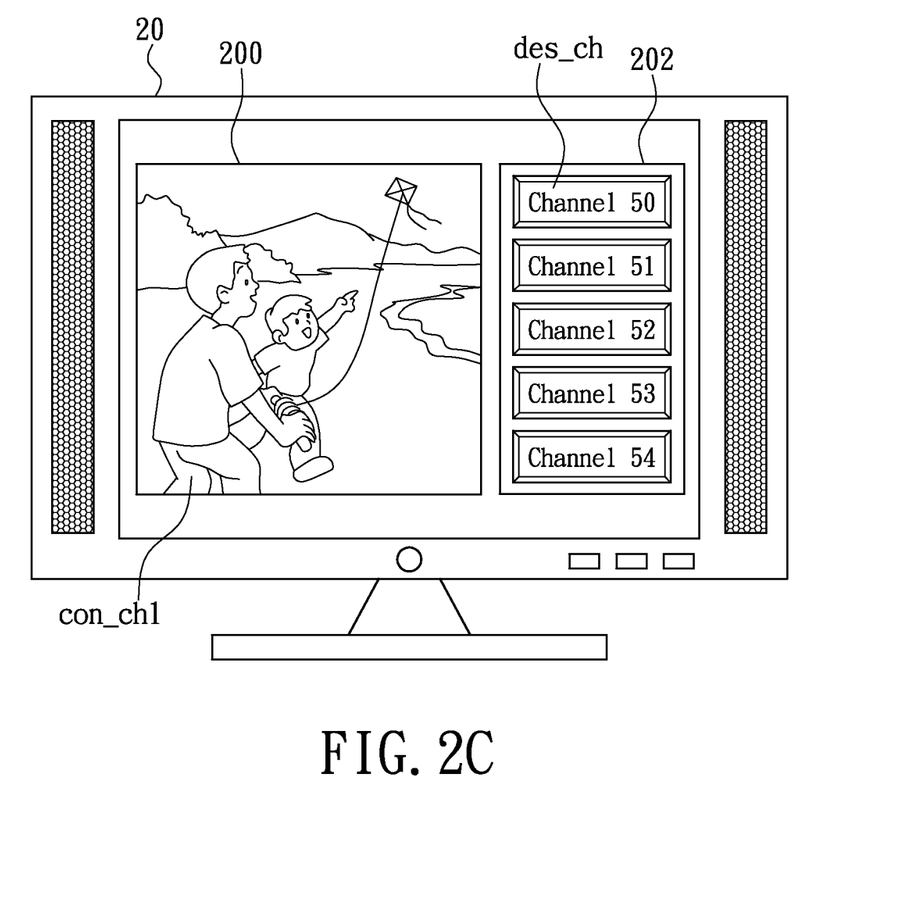
Figure 2D:
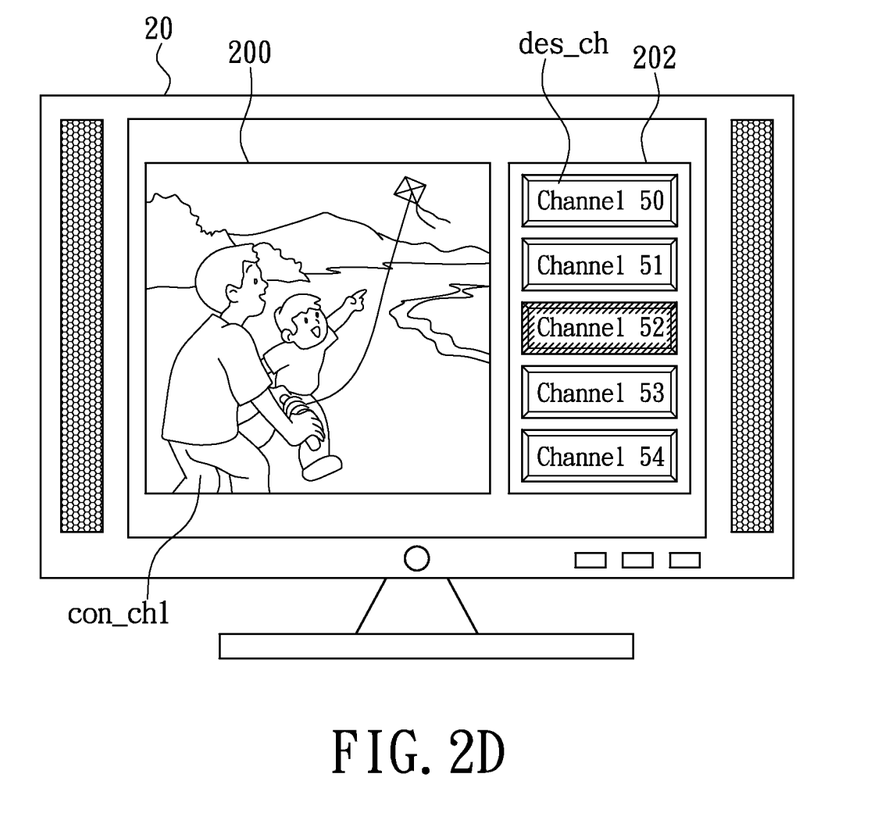

In contrast, please refer to FIG. 2C, in the case of continuous switching mode, the current first channel content con_ch1 remains on the display unit 20 yet the display area of the first channel shrinks to fit into a content area 200 (S109) so to allow a segregated information area 202 for descriptive information des_ch of a plurality channels being switched (S111). The descriptive information des_ch includes relevant information of the plurality of channels being switched; for example, text or still images showing channel numbers (as shown in FIG. 2C, "Channel 50" to "Channel 54") or program names are shown in the information area 202. When the process unit displays the descriptive information des_ch in the information area 202, the user can send a selection command through a remote control and select one of the channels being switched from the descriptive information. In the instant embodiment, given that the second channel is selected from the corresponding descriptive information of the plurality of channels being switched (S113). According to the selection command, the process unit selects the second channel, as shown in FIG. 2D "Channel 52", from the plurality of channels being switched under the continuous switching mode (S115).

After the selecting the second channel, the process unit proceeds with the process in accordance with the aforementioned step S107. That is to say the display unit shows the preview information of the second channel to replace the descriptive information (i.e. the first channel content in the content area and the information of the plurality of channels being switched in the information area). As shown in FIG. 2B, the process unit simultaneously loads the second channel content.

Figure 2E:
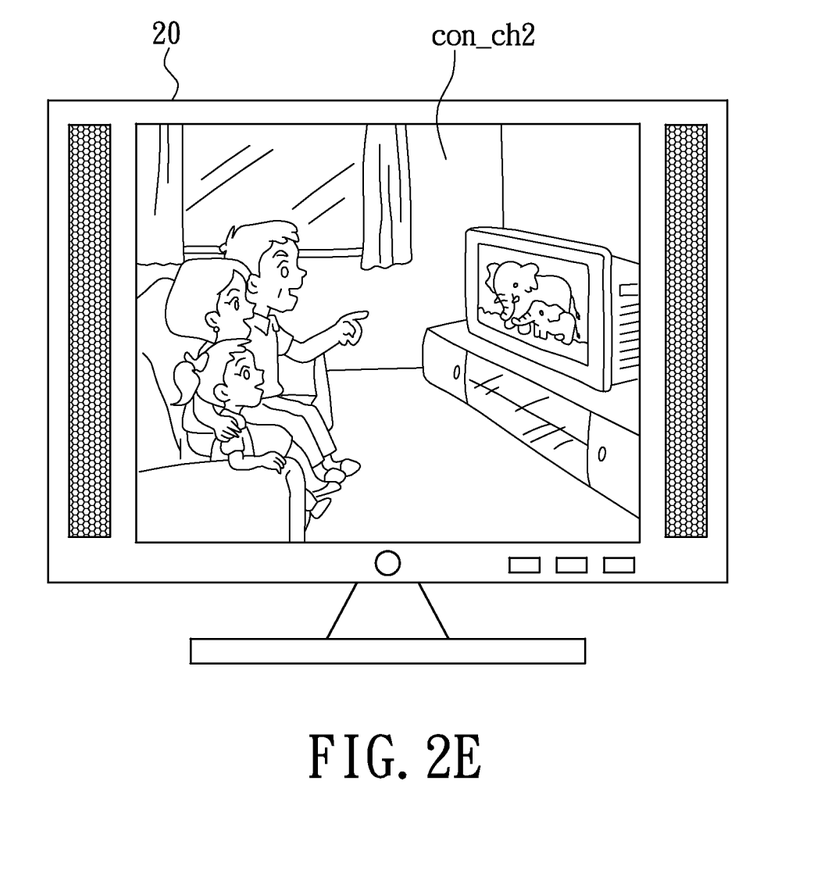

Finally, please refer to FIG. 2E, either under the continuous switching mode or the discrete switching mode, once the second channels is selected, the process unit completes the loading and no further channel switching command is received, the second channel content con_ch2 is fully displayed on the display unit 20 (S117) and thus the procedure of channel switching from the first to second channel is completed.

It is worth to note that the data quantity of the descriptive information under continuous switching mode is less than the data quantity of the preview information under the discrete switching mode. The descriptive information includes less text or low resolution still images showing program names or associated images and messages for user preliminary decision making. On the other hand, in addition to text and still images, the preview information includes audio and video streams of the second channel in a lower resolution so the user can browse the channel content in advanced.

Under the continuous switching mode, the user tends to browse through channels rapidly. In order to avoid the process unit overloading in rapid channel switching, the descriptive information, which has relatively low data quantity, is provided. In contrast, under discrete switching mode, the user might have a definite channel in mind so a single channel switching command is more likely to be given. Under the discrete switching mode, the process unit is able to provide the preview information which has larger data quantity. Hence, the channel information is provided according to user behavior and meanwhile the operation efficiency of the television system is also balanced.

In the aforementioned step (S105), the process unit determines whether the channel switching command indicates the continuous or discrete channel switching mode. Please refer to FIG. 3 for more detail of an embodiment of the determination process.

Figure 3:
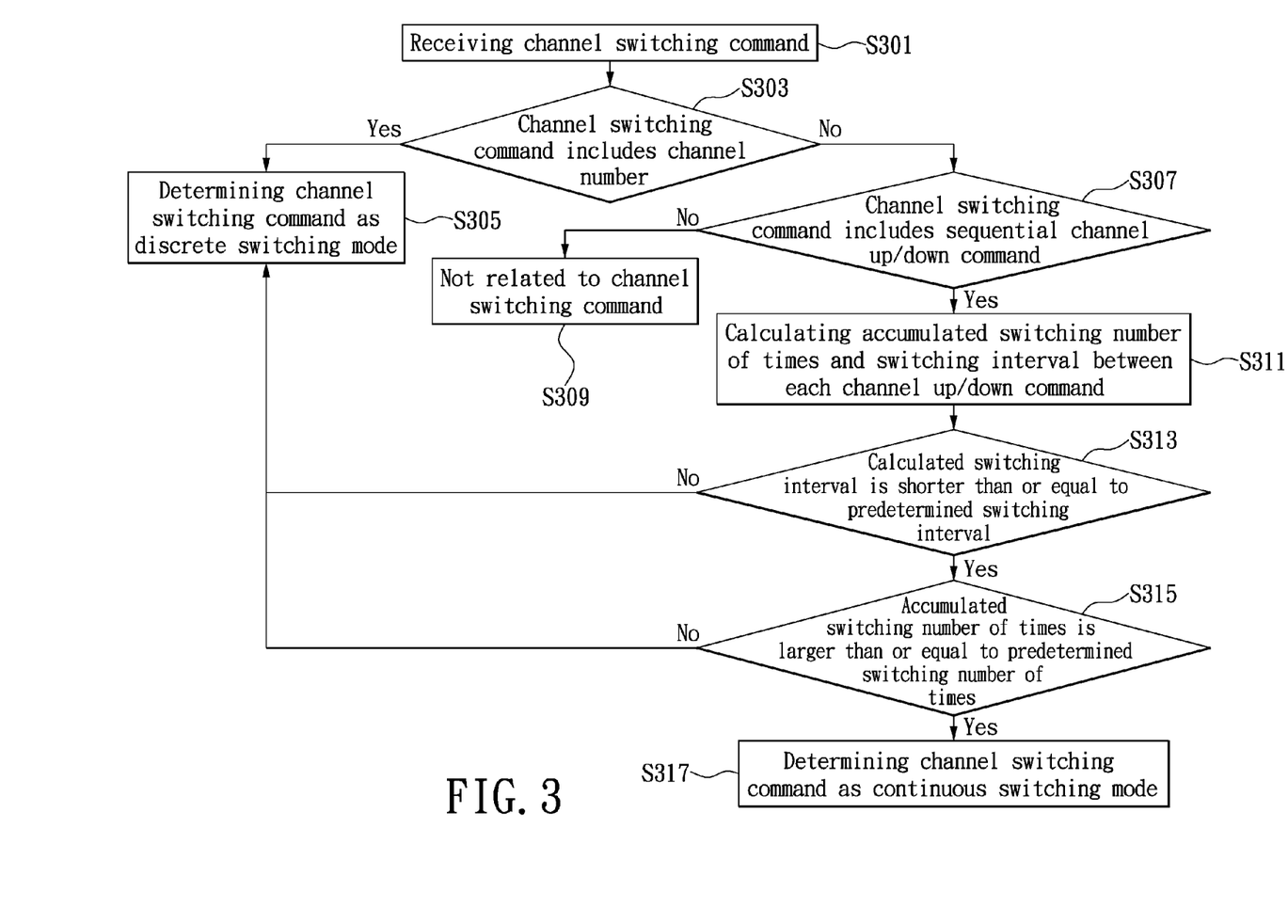
FIG. 3 illustrates a flow chart of switching mode determination by a method for providing channel information in accordance with one embodiment of the instant disclosure.

After receiving the channel switching command (S301), the process unit can determine whether the command indicates a specific channel number (S303). Please refer to FIG. 4, for example, the user firstly presses a set of number keys 400 on a remote control 40 to indicate a channel number. If the channel number corresponds to an existing channel (that is to say the user knows the second channel number and enables the television system to switch directly thereto), the process unit proceeds with the discrete switching mode (S305) and continues to the step S107 in the FIG. 1.

However, if the process unit does not receives the channel switching command with the set of number, the process unit further determines whether the command is a sequential channel up/down command from the current first channel (S307). For example, the user may press channel up/down keys 402 in the FIG. 4 to generate the channel switching command. If the command is not the channel switching command from the up/down keys either, the process unit then determines the command has no relation to channel switching (S309) and does not execute associated actions. The process unit may proceed with another assignment according to the command; for example, adjusting volume by user pressing volume keys 404.

On the contrary, if the process unit registers the channel switching command from the up/down keys, the number of times of the up/down commands received and the interval between each up/down commands are calculated (S311) as reference for further processing.

Figure 4:
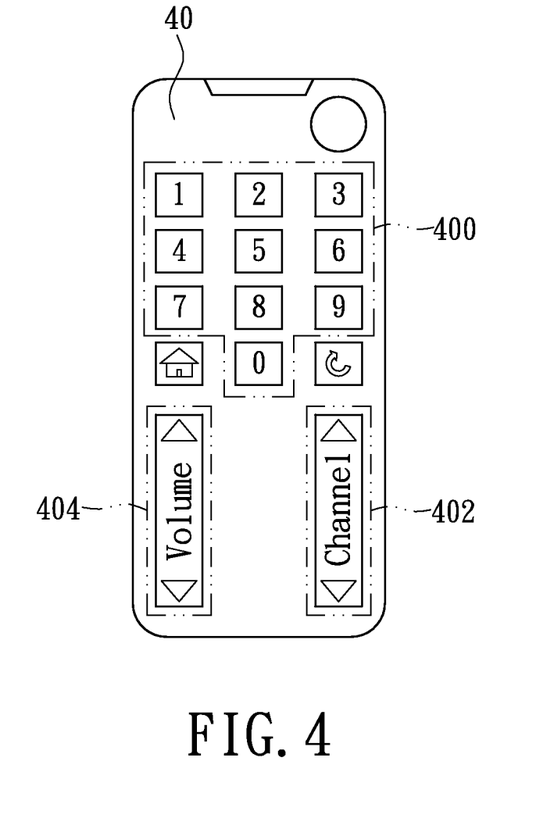
FIG. 4 illustrates a schematic diagram of a remote control and associated keys in accordance with one embodiment of the instant disclosure.

The channel up/down keys include an up key for switching to a higher channel number and a down key for switching to a lower channel number (as shown in FIG. 4) to generate the up/down channel switching command. The process of either the up or down channel switching is the same so in general, the action is described as channel up/down keys and channel up/down switching command.

Although the user may know a specific channel number, the channel up/down keys may still be used instead of number keys. For example, if the second channel is only two channels next to the first channel, the channel up/down keys are likely to be used for convenience. Thus, in the instant embodiment, switching criteria are also compared and considered in order to provide appropriate channel information according to the user behavior.

The switching criteria include a predetermined switching interval and a predetermined switching number of times as the thresholds. In the instant embodiment, given that the predetermined switching interval is 3 seconds and the predetermined switching number of times is 3 times. According to the data obtained from the step S311, the process unit calculates the switching interval between each channels being switched and compares whether the calculated switching interval is less than or equal to the predetermined switching interval (S313). In the instant embodiment, the process unit has to determine whether the calculated switching interval is above or below 3 seconds. If the calculated switching interval is above 3 seconds (i.e. the result of the step S313 is no), the process unit proceeds with the discrete switching mode (S305) because the user does not change channels rapidly.

If the calculated switching interval is below the predetermined switching interval (i.e. the result of step S313 is yes), the switching number of times is further processed (S315). In the instant embodiment, the process unit has to determine whether the accumulated switching number of times is below 3 times. If the accumulated switching number of times is less than the predetermined switching number of times (i.e. the result of step S315 is no), the process unit proceeds with discrete switching mode (S305) because the channel switching command indicates the user is switching to a specific channel instead of randomly browsing. In contrast, if the accumulated switching number of times is more than the predetermined switching number of times (i.e. the results of the step S315 is yes), the process unit proceeds with continuous switching mode (S317) and carries on to step S109 in FIG. 1 because the user is switching channels rapidly.

Specifically, the aforementioned sequence of switching number of times and interval is not limited to the sequence shown in FIG. 3 and the threshold values can vary as well. The instant disclosure shall not be limited to the examples provided in the instant embodiment.

[Embodiment of a System Providing Channel Information]

Figure 5:
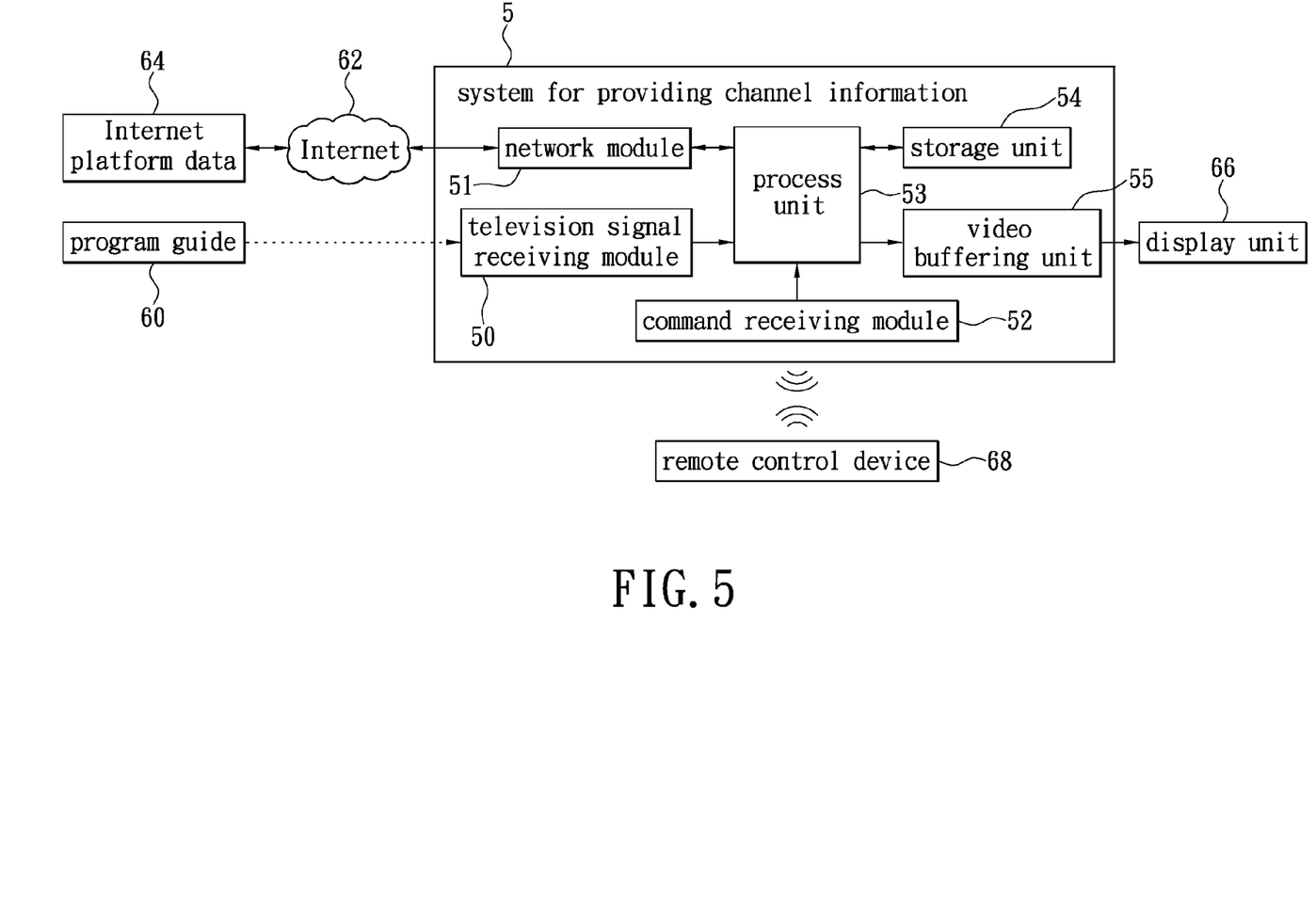
FIG. 5 illustrates a block diagram of a system providing channel information in accordance with the instant disclosure.

Please refer to FIG. 5 which illustrates a block diagram of a channel information system. The channel information system 5 includes a television signal receiving module 50, a network module 51, a command receiving module 52, a process unit 53, a storage unit 54 and a video buffering uniting unit 55. The television signal receiving module 50, network module 51, command receiving module 52, storage module 54 and video buffering unit 55 connect the process unit 53 respectively.

In the instants embodiment, the system for providing channel information 5 can be embedded or built-in in a television system with a display unit 66 (not shown in FIG. 5). Alternatively, an independent device like Set-Top-Box (STB) can interconnect the television system and the system for providing channel information 5.

The television signal receiving module 50 serves as an antenna for receiving broadcast television signal or a coaxial cable for transmitting television signals. Digital signals of program guide 60 from a television broadcasting provider are therefore received by the television signal receiving module 50. The program guide 60 can be transmitted via different frequencies to the television signal receiving module 50. The network module 51 connects Internet 62 via cables or wirelessly and follows the commands given by the process unit 53 to transmit or receive various Internet platform data 64 of corresponding channels.

The command receiving module 52 can be, for example, infra red signal receiving module, for receiving signals within the infra red frequency from a remote control device 68 (for instance, a television control or a STB control). The signals may include the channel switching command. Moreover, the command receiving module 52 can transmit commands to the process unit 53 for processing.

The process unit 53 can be, for example, Embedded Control (EC), Micro Control Unit (MCU), Application-specific integrated circuit (ASIC) or the like, for receiving the program guide 64 and Internet platform data 64 of various channels. The process unit 53 loads corresponding program guide 60 or Internet platform data 64 to the video buffering unit 55 and exports the content to the display unit 66 (for example, a screen) when the loading is completed. It is worth noted that the Network module 51 is not an essential element in the instant embodiment so the process unit 53 can accept program guide 60 alone and export television content.

When the process unit 53 receives the channel switching command, the continuous or discrete switching mode is determined thereby. Different switching modes reflect different user behaviors. When the user knows a specific channel number, the signals from the remote control device 68 of the switching number of times and the switching interval are relatively low and therefore in relation to the discrete switching mode. In contrast, when the user does not have a specific channel in mind, the user is more likely to switch a plurality of channels in a short period, for example, pressing up/down keys (referring to FIG. 4 402) continuously on the remote control 68, to generate the command of sequential channel up/down switching from the current channel (given the first channel in this case) in the channel information system 5.

In the instant embodiment, when the process unit 53 identifies the channel switching command as a series of up/down channel switching and the pattern thereof meets the switching criteria, the process unit 53 determines the condition as the continuous switching mode. On the contrary, when the process unit 53 recognizes the channel switching command as a series of up/down channel switching yet the command pattern does not meet the switching criteria or the command includes the existing channel number, the process unit 53 determines the switching mode being discrete. The switching criteria may have two thresholds including the predetermined switching number of times and interval to compare with the accumulated switching number of times and the calculated switching interval received by the process unit 53. When the process unit 53 receives the accumulated switching frequency above while the calculated switching interval below the corresponding thresholds, the channel switching command satisfies the switching criteria for continuous switching mode. Please refer to FIG. 3 for more details regarding the comparison of switching criteria.

Under the continuous switching mode, the process unit 53 can separate the display unit 66 into the content area and information area, as shown in FIG. 2C. For instance, the content area 200 occupies approximately two thirds of the display unit 66 while the information area 202 occupies the remaining area. The process unit shrinks the first channel content to fit to the content area 200. The information area 202 displays descriptive information of the channels being switched by the series of up/down channel switching. For example, the plurality of channels being switched adjacent the first channel is shown with program titles or channel numbers. Hence the user can immediately know the process unit 53 is executing the given command and providing related channel information. Specifically, the layout and size of the information and content areas can vary according to different designs and are not limited to the example shown in FIG. 2C.

Under the continuous switching mode, the user can use the remote control 68 to send a selection command to assign a channel from the descriptive information in the information area 202. For example, when the descriptive information of the channel is black out on the display unit 66, the user presses confirm key to select the channel. The process unit 53 can receive commands via command receiving module 52 and identify the selection command then select the corresponding channel (given the second channel represents the corresponding channel in this case).

The process unit 53 selects the second channel according to the selection command received under the continuous switching mode or the channel number under the discrete switching mode or the up/down channel switching command. After the process unit 53 selects the second channel, the loading of the second channel content starts. Before completion of the second channel loading, the preview information which has more data quantity compared to the descriptive information is displayed via the video buffering unit 55. The preview information may include video stream of the second channel in a smaller size or lower resolution, the channel name, number, and type or loading progress.

Thus, either the build-in or external channel information system 5 can provide appropriate channel information according to user behavior of channel switching. The associated channel information of selected channel is provided in advance without exceeding system processing capacity.

In summary, the method for providing channel information and the system thereof provide channel information while switching channels so to fill up the buffering time before the completion of loading and reduce the uncertainty of whether the channel switching command being received correctly. The interruption of video stream caused by the buffering time is also reduced.

Moreover, the method for providing channel information and the system thereof provide different types and quantities of information according to user switching behavior. The additional information is given without exceeding the processing capacity of the process unit, thus preventing system overload.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method for providing channel information adapted to a device with a display unit comprising:
    receiving a channel switching command when the display unit displays a first channel content;
    determining whether the channel switching command indicates a continuous switching mode or a discrete switching mode;
    displaying the first channel content and a descriptive information of a plurality of channels being switched on the display unit until a second channel being selected among the plurality of channels being switched if determining the channel switching command indicating the continuous switching mode;
    displaying a preview information of the second channel on the display unit replacing the first channel content and simultaneously loading the second channel content if determining the channel switching command indicating the discrete switching mode or after the selection of the second channel under the continuous mode; and
    displaying the complete second channel content on the display unit when the loading finished;
    wherein the preview information includes part of the second channel content and the data quantity of the descriptive information is less than the data quantity of the preview information;
    wherein determining the channel switching command being under the continuous switching mode when the channel switching command is a sequential channel up/down switching from the first channel and being an up/down channel switching command satisfying a switching criteria;
    wherein determining the channel switching command being under the discrete switching mode when the channel switching command includes a channel number of the second channel or a sequential channel up/down switching from the first channel yet not being the up/down channel switching command satisfying the switching criteria.

2. The method for providing channel information according to claim 1, wherein the switching criteria includes an accumulated switching number of times which is more than or equal to a predetermined switching number of times and a calculated switching interval between each of the plurality of channel being switched which is less than or equal to a predetermined switching interval.

3. The method for providing channel information according to claim 1, wherein the preview information includes the audio and visual information of the second channel while the descriptive information includes program guide of the plurality of channels being switched.

4. The method for providing channel information according to claim 1, wherein the steps of displaying the first channel content and the descriptive information of the plurality of channels being switched on the display unit until the second channel being selected among the plurality of channels being switched comprise:
    separating the display unit into a content area and an information area, shrinking the size of the first channel content to fit into the content area and displaying the descriptive information of the plurality of channels being switched in the information area;
    receiving a selection command of the descriptive information of the second channel; and
    selecting the second channel according to the selection command.

5. A system for providing channel information adapted for displaying channel information on a display unit comprising:
    a command receiving module receiving a channel switching command; and
    a process unit connecting the display unit and the command receiving module and determining whether the channel switching command indicates a continuous switching mode or a discrete switching mode starting from a first channel;
    wherein if determining the channel switching command indicating the continuous switching mode, the process unit outputs the first channel content continuously to the display unit, separately displays a descriptive information of a plurality of channels being switched until a second channel being selected there-from, while if determining the channel switching command indicating the discrete switching mode or after the selection of the second channel under the continuous mode, the process unit outputs a preview information of the second channel replacing the first channel content to the display unit, simultaneously loads the second channel content and displays the complete second channel content when the loading finished;

wherein the data quantity of the descriptive information is less than the data quantity of the preview information;

wherein the process unit determines the channel switching command being under the continuous switching mode when the channel switching command is a sequential channel up/down switching from the first channel and being an up/down channel switching command satisfying a switching criteria while the process unit determines the channel switching command being under the discrete switching mode when the channel switching command includes a channel number of the second channel or a sequential channel up/down switching from the first channel yet not being the up/down channel switching command satisfying the switching criteria.

6. The system for providing channel information according to claim 5, further comprising:
a television signal receiving module connecting the process unit for receiving program content of one or more television channels.

7. The system for providing channel information according to claim 5, further comprising:
a network module connecting the process unit for connection to the Internet by the control of the process unit and transmitting remote Internet platform data of at least one channel content.

8. The system for providing channel information according to claim 7, further comprising:
a video buffering unit connecting the process unit and coupling the display unit to temporarily store video streams of the content or information awaiting for loading to the display unit.

9. The system for providing channel information according to claim 6, further comprising:
a network module connecting the process unit for connection to the Internet by the control of the process unit and transmitting remote Internet platform data of at least one channel content.

10. The system for providing channel information according to claim 9, further comprising:
a video buffering unit connecting the process unit and coupling the display unit to temporarily store video streams of the content or information awaiting for loading to the display unit.

11. The system for providing channel information according to claim 5, wherein the switching criteria includes an accumulated switching number of times which is more than or equal to a predetermined switching number of times and a calculated switching interval between each of the plurality of channel being switched which is less than or equal to a predetermined switching interval.

12. The system for providing channel information according to claim 5, wherein the preview information includes the audio and visual information of the second channel while the descriptive information includes program guide of the plurality of channels being switched.

13. The system for providing channel information according to claim 5, wherein the process unit separates the display unit into a content area and an information area, and shrinks the size of the first channel content to fit into the content area and displays the descriptive information of the plurality of channels being switched in the information area when determining the channel switching command indicating the continuous switching mode.

14. The system for providing channel information according to claim 5, wherein the process unit receives a selection command of selecting the descriptive information of the second channel among the channels being switched and selects the second channel according to the selection command.

15. The system for providing channel information according to claim 5, wherein the system for providing channel information is embedded in or externally connected to a television system with the display unit.

16. A non-transitory computer readable storage medium, recording a set of program code, wherein when the set of program code is loaded to a processor, the processor executes the method for providing channel information as recited in claim 1 according to the set of program code.

* * * * *